(12) United States Patent
Smith et al.

(10) Patent No.: US 6,477,703 B1
(45) Date of Patent: Nov. 5, 2002

(54) SOFTWARE PATCH SELECTION TOOL

(75) Inventors: Randolph C. Smith, Acworth, GA (US); Kay Chan, Los Altos Hills, CA (US); Abbey Macias, Sacramento, CA (US); Eric Marakovits, Marietta, GA (US); Linda Richards, Snellville, GA (US); Janet Ritzer, Atlanta, GA (US); Roger Spotts, Kennesaw, GA (US); Lisa Stapleton, Alpharetta, GA (US); Mary Beth Titman, Sugar Hill, GA (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/342,763

(22) Filed: Jun. 29, 1999

(51) Int. Cl.[7] ................................................ G06F 9/455
(52) U.S. Cl. ..................... 717/168; 717/168; 717/174; 717/175
(58) Field of Search ................................ 717/1, 11, 168, 717/169, 170, 172, 174, 177; 707/203, 204, 511

(56) References Cited

U.S. PATENT DOCUMENTS

| | | | | | |
|---|---|---|---|---|---|
| 5,357,629 A | * | 10/1994 | Dinnis et al. | ................ | 707/203 |
| 5,481,713 A | * | 1/1996 | Wetmore et al. | ................ | 717/5 |
| 5,678,039 A | * | 10/1997 | Hinks et al. | ................ | 707/4 |
| 5,797,016 A | * | 8/1998 | Chen et al. | ................ | 717/11 |
| 5,966,540 A | * | 10/1999 | Lister et al. | ................ | 717/174 |
| 6,071,317 A | * | 6/2000 | Nagal | ................ | 717/128 |
| 6,073,214 A | * | 6/2000 | Fawcett | ................ | 711/133 |
| 6,115,646 A | * | 9/2000 | Fiszman et al. | ............ | 700/181 |
| 6,135,651 A | * | 10/2000 | Leinfelder et al. | ............ | 717/11 |
| 6,161,218 A | * | 12/2000 | Taylor | ................ | 717/11 |
| 6,202,207 B1 | * | 3/2001 | Donohue | ................ | 717/11 |
| 6,289,509 B1 | * | 9/2001 | Kryloff | ................ | 717/11 |
| 6,327,706 B1 | * | 12/2001 | Amberg et al. | ............ | 717/174 |
| 6,338,149 B1 | * | 1/2002 | Ciccone, Jr. et al. | ......... | 714/38 |
| 6,347,398 B1 | * | 2/2002 | Parthasarathy et al. | ..... | 717/178 |

OTHER PUBLICATIONS

Lyu et al, "A procedure based dynamic software update", IEEE, pp 271–280, 2001.*

Ali, "Software patching in the SPC environment and its impact on switching system relaibility", IEEE, pp 626–631, 1991.*

Hollingsworth et al, "Uisng content derived names for configuartion management", ACM SSR, pp 104–109, 1997.*

Hicks et al, "Dynamic software updating", ACM PLDI, pp 13–23, 2001.*

* cited by examiner

Primary Examiner—Anil Khatri
(74) Attorney, Agent, or Firm—Richard F. Schuette

(57) ABSTRACT

A patch selection tool providing a method and apparatus for identifying software patches for installation on a computer system in which current versions of software applications installed on the computer system are identified as well as currently installed patches, products, and versions. An initial list of recommended patches is generated based on the combination of the installed products and the validated list of datasheet selected products, a final list is created by modifying the initial list to remove bad or outdated patches.

10 Claims, 6 Drawing Sheets

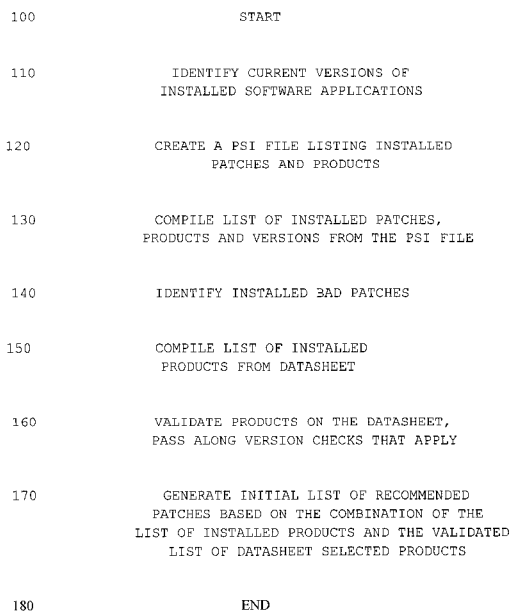

100 START

110 IDENTIFY CURRENT VERSIONS OF
INSTALLED SOFTWARE APPLICATIONS

120 CREATE A PSI FILE LISTING INSTALLED
PATCHES AND PRODUCTS

130 COMPILE LIST OF INSTALLED PATCHES,
PRODUCTS AND VERSIONS FROM THE PSI FILE

140 IDENTIFY INSTALLED BAD PATCHES

150 COMPILE LIST OF INSTALLED
PRODUCTS FROM DATASHEET

160 VALIDATE PRODUCTS ON THE DATASHEET,
PASS ALONG VERSION CHECKS THAT APPLY

170 GENERATE INITIAL LIST OF RECOMMENDED
PATCHES BASED ON THE COMBINATION OF THE
LIST OF INSTALLED PRODUCTS AND THE VALIDATED
LIST OF DATASHEET SELECTED PRODUCTS

180 END

FIG. 1

START

202  LOAD PSI FILE TO SCC PATCH TOOL

204  SELECT PSIFILE FROM LIST AND ENTER SYSTEM HANDLE

206  IS THIS A NORMAL ANALYSIS OR UPGRADE ANALYSIS?

208  PULL HOSTNAME FROM PSIFILE

210  IS THERE A DATASHEET WITH A MATCHING HOSTNAME?

212  IF NO, DISPLAY ERROR MESSAGE

213  DISPLAY ERROR MESSAGE, STOP PROCESSING

214  IS OS SELECTED ON DATASHEET VALID? IF NO, GOTO 213

215  END

FIG. 2

START

| | |
|---|---|
| 310 | LIST PATCHES INSTALLED ON THE SYSTEM (READ PSIFILE) |
| 320 | ASCERTAIN IF PATCHES ARE CORRECT FOR THE OPERATING SYSTEM |
| 325 | IF NOT APPLICABLE, DISPLAY ERROR MESSAGE, REMOVE PATCH |
| 330 | LIST INSTALLED PRODUCTS WITH VERSION NUMBERS |
| 340 | IS THIS FIRST TIME THROUGH ROUTINE? |
| 350 | IS THIS AN UPGRADE ANALYSIS? |
| 355 | LIST PATCH SETS ASSOCIATED WITH LISTED PRODUCTS |
| 360 | CONFIRM EACH PATCH SET VERSION MATCHES INSTALLED PRODUCTS |
| 365 | REMOVE ANY PATCH SET THAT DOESN'T MEET THE PRODUCT/VERSION COMBINATION INSTALLED ON THE SYSTEM, OR IF NOT PATCHES ARE ASSOCIATED WITH IT |
| 370 | DISPLAY RECOMMENDED PATCHES AND ASSOCIATED PRODUCT/VERSION |
| 375 | LIST ALL PATCHES HAVING DEPENDENCY REQUIREMENTS |

FIG. 3

START

410     COMPARE THE INSTALLED PATCH LIST
FROM PSIFILE WITH RECOMMENDED PATCH LIST

415     DUPLICATE PATCHES FROM
THE RECOMMENDED LIST

420     REMOVE SUPERSEDED PATCHES
FROM RECOMMENDED LIST

425     ADD ALL FUNCTIONALITY OF CURRENTLY
INSTALLED PATCHES TO RECOMMENDED PATCHES

430     LIST INSTALLED PATCHES
THAT ARE SUPERCEDED

END

FIG. 4

START

510  ANY RECOMMENDED PATCHES SUPERSEDED
BY INSTALLED PATCHES, IF YES, GOTO 515

515  REMOVE SUPERSEDED RECOMMENDED PATCHES

520  ARE THERE ANY INSTALLED OR RECOMMENDED
PATCHES MARKED BAD?
IF YES, LIST BAD PATCHES

530  INSTALL REPLACEMENT PATCHES MANUALLY

540  COMPARE RECOMMENDED PATCH LIST
AGAINST APPLICABLE FILE SETS

545  IF ASSOCIATED FILE SET NOT PRESENT,
REMOVE PATCH FROM RECOMMENDED LIST

550  ANALYZE RECOMMENDED AND INSTALLED
LIST FOR STRUCTURAL CONFLICTS

END

FIG.5

START

610    ARE THEIR COMMON MODULES BETWEEN RECOMMENDED PATCHES? IF YES, IGNORE AS FUNCTIONALITY IS CUMULATIVE

620    DISPLAY CONFLICTS BETWEEN CONFLICTING PATCHES

630    DISPLAY FINAL MASTER PATCH LIST

640    REANALYZE MASTER PATCH LIST

650    PROVIDE TRACKING ID AND LIST OF PATCHES THAT WILL BE SENT TO CUSTOMER

660    UPDATE PATCH REQUEST QUEUE (IE. TRACKING ID)

665    MOVE PATCH REQUEST FROM PATCH REQUEST QUEUE TO PATCH QUEUE HISTORY

670    MOVE Pistil FROM HOME DIRECTORY TO OLD PSIFILE DIRECTORY

END

FIG. 6

SOFTWARE PATCH SELECTION TOOL

FIELD OF THE INVENTION

The present invention relates to methods and apparatus for selecting software patches on a computer operating system, and, more particularly, for selecting software patches for installation on an HP-UX operating system.

BACKGROUND OF THE INVENTION

The software portion of most computer systems includes both an operating system and a broad array of application programs, both of which are subject to regular modification. The release of a new version of a Microsoft operating system always makes headlines as it typically impacts existing application programs running on the computer system and may necessitate modification to operate properly. Additionally, no software program is perfect and the release of numerous software patches to fix specific problems, and the release of new versions to fix or upgrade major problems are the norm.

Between the release of new versions of a software product, minor modifications and "bug fixes" are typically made by the software developer in the form of software patches which are accessible for installation by users. There exists patch installation products that provide for identifying known patches as part of the Customer Operation Profile function in most computer operating systems. These prior solutions have the disadvantage of being very time consuming to use as they list every possible patch that could apply to a given system (sometimes more than 300) and require a manual sort through the list of patches to determine which patches are most relevant. A complete patch analysis takes approximately two to four hours. Prior solutions, for example ProPatch, provide a rough capability to target patches strictly according to a product/file set combination, however, patches are often required on items that reside in different areas. For instance, patching Omniback requires more than just patching the product itself, patches are required for commands, kernel, and file systems.

There exists a need for a high quality patch analysis tool that takes extensive knowledge of products, patches, and system-level knowledge.

A need also exists to provide a capacity for true grouping of patches according to product.

A need also exists to provide for the automatic recognition of the product version on a customer's systems, such that a user is not forced to figure out the version of the product and choose the appropriate patches.

It would be desirable and of considerable advantage to provide a patching tool that solves the problem of irrelevant patches, employs extensive knowledge, and is a true product-based patching tool by having the tool's user select from a list of products which are backed by sets of patches that have been researched for relevance to the product being patched. Further, such a patch tool could be advantageous if version smart, in that it can understand the version of information passed back such that version specific patches may be chosen, especially if the new patch tool provided an improvement in any of the following areas: reduction in time required to complete a patch analysis, smaller list of patches to choose from, patching performed according to how customers view their system (at the true product level) and the ability to research potential patches such that less knowledge is needed by the person performing the patch analysis.

SUMMARY OF THE INVENTION

The present invention is a patch selection tool providing a method for identifying software patches for installation on a computer system. Current versions of desired operating systems, software applications and patches installed or to be installed on the computer system are identified. A script is run on the computer system to create a file (called a PSIfile) of the actual operating system, software applications and patches, including versions, that are properly installed on the system. The PSIfile is uploaded into the patch tool and any installed patches which are bad are identified. The patch tool then compares the list of desired operating systems, software applications and patches to those actually installed as identified in the PSIfile. An initial list of recommended patches is generated by identifying those patches associated with the combination of the installed products and the validated list of datasheet selected products.

The initial list of patches is checked for patches that are missing dependent patches; and dependencies are added as necessary. The initial list is also checked against itself and against the list of installed patches to remove patches that are anticipated by newer versions of software that have already been installed or recommended. The list is also checked to make sure the recommended patches will execute upon installation. If there are bad patches that have not been resolved, the user is presented with a list of the bad patches, and is forced to resolve them before continuing. If the patch tool was already going to recommend a newer version of a bad patch, the new patch is given.

A final check list is checked against itself for patches that cause structural conflicts. Structural conflicts are presented to the user for further, manual intervention.

The patch tool user reviews the final list and can deselect any of the recommendations or manually add patches and re-analyze, download the list of patches into the Xpatch patch ordering tool, or the user may load the list of patches into an ongoing patch analysis.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 1 is a flowchart illustrating the method for selecting software patches.

FIG. 2 is a detailed flowchart illustrating part of the method for selecting software patches, in particular, the portion for listing installed patches and products.

FIG. 3 is a detailed flowchart illustrating part of the method for selecting software patches, in particular, the portion for listing the initial recommended patches and the check for dependencies.

FIG. 4 is a detailed flowchart illustrating part of the method for selecting software patches, in particular, the portion for comparing the installed patch list with the recommended patch list.

FIG. 5 is a detailed flowchart illustrating part of the method for selecting software patches, in particular, the portion for comparing the recommended patch list with the installed patch list.

FIG. 6 is a flowchart illustrating part of the method for selecting software patches, in particular, the portion for displaying the final master patch list.

DETAILED DESCRIPTION OF THE PREFERRED EMBODIMENTS

Referring now to FIG. 1, operation of the patch tool in accordance with the invention is illustrated. Current versions of desired operating systems, software applications and patches installed or to be installed on the computer system are identified (step 110). In the preferred embodiment, a user fills out a datasheet, or is interviewed and questions about system configurations. Alternatively, such information could be collected without user intervention by employing a tool that could remotely access the users system and collect the information. A script is run on the computer system to create a file (called a PSI file) of the actual operating system, software applications and patches, including versions, that are properly installed on the system (step 120). The PSIfile is uploaded into the patch tool and any installed patches which are bad are identified (step 130/140). The patch tool then compares the list of desired operating systems, software applications and patches to those actually installed as identified in the PSIfile (step 150/160). An initial list of recommended patches is generated by identifying those patches associated with the combination of the installed products and the validated list of datasheet selected products (step 170).

For example, a customer whose computer operating system and/or resident software products may require software patches to update erroneous or outdated code is interviewed to ascertain the current status of products that may need a patch. A datasheet, typically including "checkboxes" as illustrated in FIG. 1B is sometimes sent to the customer and the results are entered to complete the database. Direct dialog with a customer may include questions like: "You're using LVM right?"; "Are you using 100Base-T?"; and "I know you've got Oracle installed, should we patch it?". If items are uncovered that do not appear as checkboxes on the datasheet, they can be added in the Comments section for review by the person doing the patching. If the user is going to do the patching himself, a collect script is sent to generate a Product Specific Information file (PSIfile).

The Hewlett-Packard Company has a Software Change Center department which includes a "patching central" for implementing the patching process. A patch analysis datasheet is downloaded from patching central and brought up on screen with one "click". From the requested patch form, the user can elect to have the tool automatically email the collect script, or have patching central dial-in, or a number of other options. Once the form is filled in and the user clicks submit, the collect script is emailed automatically, and an entry is put into patch central's queue.

FIG. 2 illustrates the portion of the preferred embodiment of the invention that provides for listing installed patches and products. At step 202, the PSIfile is loaded to the SCC patch tool. In particular, this file can be emailed to the SCC email box, or collected from a dial-up session, or gotten from tape. There are a number of methods, including the Upload PSIfiles interface for uploading the PSIfile into the tool. At step 204, the PSIfile is selected from the list and the system handle is entered. All PSIfiles loaded into the tool that haven't already had a patch analysis completed for them are listed in a pull-down box at the start of the tool. The system handle is entered, and if entry has been through a previous screen that would have carried the system handle forward, the handle will be pre-filled. At step 206, a selection of either a normal analysis or an upgrade analysis is made. If the customer is doing an upgrade analysis, it is not apparent what versions of some products the customer is going to (SNA, 100Base-T, etc.) and some of the patches won't be applicable, thus, this information must be ascertained before proceeding. If the customer is doing a normal analysis, we can be sure that the products, version numbers, and patches that are in the PSIfile are generally valid and applicable. At step 208, the hostname is pulled from PSIfile. A determination is made whether there exists a datasheet with a matching handle-hostname by checking the datasheet database to see if there's a datasheet for this specific handle-hostname combination (step 210). If yes, skip to step 215. If no, display an error message and make the user start again (Step 212. Next a determination is made as to whether the OS selected on the datasheet valid (step 214)? (in the preferred embodiment embodiment, the patch tool only has patch sets for HP's most popular OS revisions (10.01, 10.10, 10.20, and 11.00). If the OS on the datasheet is not one of those, we display an error message and stop processing (step 213).

FIG. 3 illustrates the portion of the invention for listing the initial recommended patches and the check for dependencies. At step 310, the patches installed on the system, including status and one line description, are listed by reading the PSIfile which includes status information (is it general release (current), superseded (old), or bad?), and one-liner description text. For each installed patch, a decision is made whether the patch is correct for the operating system (step 320). And if the patch is not applicable for this OS, then display a message indicating that the patch doesn't apply and remove the patch from the list of installed patches (step 325). The installed products are then listed along with version numbers by reading the PSIfile to get a list of all installed products and their version numbers (step 330).

At step 340, a decision is made as to whether this is the first time through the routine. If this not the first time through (i.e. reanalyzing or replacing bad patches), recommendations based on the installed products have already been made, and there is no need to recommend the same patches again. At step 350, a decision is made as to whether this an upgrade analysis. If this is an upgrade analysis, and it is not possible to ascertain what product versions a customer is going to, patches that are associated with products that have specific versions (Omniback, 100Base-T, SNA, etc.) cannot be recommended. At step 350, with the exception of those sets with product versions, all of the selected patch sets from the datasheet are pulled in and a list of products associated with these patch sets is created (step 355). At step 360, a check is made as to whether each patch set version matches the installed products. For patch sets with no version number, there is only one patch set. For patch sets with more than one version number, there can be many patch sets associated with the product and a review of each patch set is required to find the appropriate one. If a particular patch set doesn't meet the product/version combination installed on the system or if it doesn't have any patches associated with it, it is removed from the patch list (step 365). Patch sets that have passed all of the checks this far are displayed so the user knows that the product or product/version will be patched (step 370). At step 380, an initial list of recommended patches, with status, one liner, sets, and patch dependencies is created by reading through the list of valid patch sets and gathering the list of patches for each set into an initial list of recommended patches and checking each patch to see if there are patches that are flagged in the patch database as needing to be installed with this patch. If a patch doesn't have a dependency, this check is immaterial. At step 385, all patches having dependency requirements are listed for the user unless the dependency is already installed or recommended. All the listed dependencies not already installed or recommended are added to the list of recommended patches.

In FIG. 4, the installed patch list from the Pistil is compared with the recommended patch list (step 410) and if any of the recommended patches are already installed, there's no need to send them again. Furthermore, so are duplicate patches removed from the recommended list (step 415). At step 420, the recommended list is checked for superseded patches within itself and superseded patches are removed from the patch list. Similarly, the list of currently installed patches is compared with the recommended patches for supersedes all the functionality of an older patch in a family tree is rolled into newer patches in that family tree (step 425). At step 430, a list of those installed patches that are superseded by recommended patches is made and displayed to the user.

FIG. 5 illustrates the comparison of the recommended patches with the installed patches. All the functionality of an older patch in a family tree is rolled into new patches in that family tree, thus, there is no reason to send an older patch, if a newer one is already on the system. At step 510, a decision is made as to whether there are any recommended patches superseded by installed patches. If so, the recommended patches are removed from recommended list (step 515). At step 520, a decision is made as to whether there are any installed or recommended patches marked BAD. The BAD patches, and any recommended replacement patch are listed, preferably with a text box. Since bad patches will have a newer replacement (eventually), it may be the case that the replacement patch is already on the recommended patch list, so the text box if filled out with the replacement, if there is one. At step 530, the replacement patches are installed manually. The recommended patch list is then compared against applicable filesets (step 540) as a patch will not install if at least one fileset is not present on the system. If an associated fileset is not present, then those patches are removed from recommended list. At step 550, the recommended and installed list is analyzed for structural conflicts as sometimes two or more non-related patches will try to fix the same piece of code in different ways, causing potential conflicts and possible system errors. Conflicts are identified for the user as there may be circumstances where the user will want to choose between patches, so choices between patches are not forced.

In FIG. 6, a final master list is presented after a decision is made as to whether there are common modules between the recommended patches, and/or installed patches. If common modules exist between related patches, they can be ignored as functionality is cumulative within a patch's family tree. If common modules exist between patches that are dependent on each other, they can also be ignored as they're related although not in the same family tree (step 610). At step 620, any conflicts are displayed to allow the user to choose between the conflicting patches. The user can "click" on the desired patch (resulting in a deselect of the other patch(es) from the final master list). The Final Master Patch List is then displayed (Step 630). Each patch is listed on a separate line with a checkbox in front to allow the user to deselect (therefore not send) a patch. Each line has the following information from the patch database: Patch Name, Present Status, Critical Flag, Reboot Flag, Patch Dependency, Other Dependency—(this includes the Other Dependency and HP Only Flag), One Line Description, Patch Set(s) from which the patch came.

Should changes to the patch list be required at a later date, for example, if the engineer runs into conflicts, removes patches from the master list, wants to add patches, or runs into new dependencies, the final master list must be reanalyzed.. Reanalyzing means carrying some information forward, and starting the process at the beginning, skipping a few steps (step 640). If the engineer doesn't want to make changes to the final master list, then the list of patches is delivered to the patch ordering mechanism (Xpatches).

At step 650, a tracking id is provided after delivering the list of patches to the ordering mechanism, prompting the user for a tracking id. A large text box is then displayed with the list of patches that will be sent to the customer along with a patch/patch set cross-reference table. Sometimes the user will only want to receive an email with the list of patches that would be sent, and doesn't want to finish up the request at this moment. If that's the case, the user has entered the word email when prompted for the tracking id. A tracking id of email sends the email list of patches, but does not perform any further processing.

Finally, the Patch Request Queue is updated with the request ID from Xpatches, and in particular, update the entry with the tracking id (step 660). The patch request is moved from Patch Request Queue to the Patch Queue History and the Pistil is moved from the home directory to the old_ PSIfile directory (steps 665 and 670).

While the invention has been described and illustrated with reference to specific embodiments including a datasheet filled out by a user or by an interviewer, those skilled in the art will recognize that modification and variations may be made such that the invention is equally applicable to automated systems in which a datasheet or the like can be filled out remotely. Additionally, the invention provides for risk segmentation such that customers can be categorized into how much risk they are willing to take for system modifications. A customers risk tolerance to change is employed for ascertain which patches to recommend. Factors from the parent lab and factors from the patch itself are employed to predict the level of risk associated with that patch and impact the creation of recommended patch sets.

What is claimed is:

1. A method for identifying software patches for installation on a computer system comprising the method steps of:
   identifying the current versions of software products installed on the computer system,
   running a script on the computer system to create a Product Specific Information file listing patches and products, including versions, that are currently installed on the system,
   pulling a list of the currently installed patches, products, and versions from the PSI file,
   identifying any currently installed patches which are bad,
   filling out a datasheet identifying new software products to be installed on the computer system,
   validating new software patches for those new software products identified on the datasheet having patches associated with them that pass any version checks that apply,
   generating an initial list of recommended patches based on the combination of the list of currently installed patches that are not bad and the validated new software patches.

2. The method for identifying software patches for installation on a computer system as claimed in claim 1, the step of identifying the current versions of software applications further comprising the steps of identifying product versions and the step of ascertaining whether a patch will install.

3. The method for identifying software patches for installation on a computer system as claimed in claim 1, the step of identifying the current versions of software applications further comprising the step of filling out a datasheet, wherein, the identification of products installed on the computer system provides for the identification of associated patches.

4. The method for identifying software patches for installation on a computer system as claimed in claim 1, further comprising the step of determining whether any recommended patches require dependent patches, and adding missing dependent patches to list of recommended patches if the dependent patch is not all ready recommended, installed, or superseded by a dependent or currently installed patch.

5. The method for identifying software patches for installation on a computer system as claimed in claim 4, further comprising the step of checking the list against itself and against the list of installed patches to remove patches that are anticipated by newer versions of software not requiring a patch, such software having already been installed or recommended.

6. The method for identifying software patches for installation on a computer system as claimed in claim as claimed in claim 5, wherein the list is also checked to make sure the recommended patches will run on the customer's system, when the customer tries to install, and wherein, if there are bad patches that haven't been resolved, the user is presented with a list of the bad patches, and is forced to resolve them before continuing.

7. The method for identifying software patches for installation on a computer system as claimed in claim 6, wherein, if the patch tool was already going to recommend a newer version of a bad patch, the new patch is given.

8. The method for identifying software patches for installation on a computer system as claimed in claim 7, further comprising the step of checking the list of recommended patches for patches that cause structural conflicts, wherein, structural conflicts are presented to the user for further, manual intervention.

9. The method for identifying software patches for installation on a computer system as claimed in claim 4, further comprising the step of reviewing the final list of recommended patches and deselecting any of the recommended patches or manually adding additional patches.

10. The method for identifying software patches for installation on a computer system as claimed in claim 9, further comprising the step of ordering the patches for installation on the computer system.

* * * * *

UNITED STATES PATENT AND TRADEMARK OFFICE
CERTIFICATE OF CORRECTION

PATENT NO. : 6,477,703 B1
DATED : November 5, 2002
INVENTOR(S) : Randolph C. Smith et al.

It is certified that error appears in the above-identified patent and that said Letters Patent is hereby corrected as shown below:

Column 7,
Line 17, after "computer system" delete first occurrence of -- as claimed in claim --

Signed and Sealed this

Twenty-ninth Day of June, 2004

JON W. DUDAS
*Acting Director of the United States Patent and Trademark Office*